United States Patent Office 2,999,026
Patented Sept. 5, 1961

2,999,026
NONSTAINING PIGMENTS AND THEIR USE
Chester Davis, 415 E. 5th St., Newport, Ky.
No Drawing. Filed Apr. 3, 1958, Ser. No. 726,044
17 Claims. (Cl. 106—23)

The purpose of this invention is to provide a novel series of triphenylmethane dye pigments for use in recording inks and copy papers. These pigments do not chemically stain skin or clothing, and certain of these pigments provide unusually deep colors that have up to now been obtainable only by the use of mixtures of two or more dyes.

The triphenylmethane dye pigments, primarily the phosphotungstate lakes and the tannin lakes, have long been used for printing purposes because of the intense prints obtainable with only small amounts of these pigments. Crystal violet lakes, for example, have long been used in typewriter ribbons and in carbon papers as a "toner" for the somewhat brown-tinged carbon black. Unfortunately, the violet shade of these toners does not give a true black print; and most manufacturers of carbon papers use a mixture of crystal violet toner and nigrosine toner in their papers.

It is almost axiomatic in color chemistry that no single simple structure gives a true black; all known jet black dyes are complex mixtures of different structures. The complex blue-black dyes are blue-violet in low concentrations and black at high concentrations (3–5%). For many years commercial dye chemists have unsuccessfully searched for a black or blue-black triphenylmethane dye which would extend the spectrum of intense colors obtainable with the triphenylmethane series of dyes. The author of the present invention has finally achieved this goal; and pigments are now obtainable from a single pure triphenylmethane compound which are blue-black to black in shade.

It is well known in the copying field that water-insoluble crystal violet phosphotungstate and crystal violet tannate lakes do not seriously stain the human skin from water-suspensions; the sole reason being that these materials are too insoluble in water to dissolve in the perspiration of the skin. For recording purposes, however, these pigments are customarily used in non-aqueous vehicles (oleic acid, alcohols, waxes, etc.) which dissolve small amounts of the pigment; and the suspensions of these toners in organic vehicles readily stain the skin: a fact well-known to any person who has ever changed a typewriter ribbon containing crystal violet toners. The present invention provides a series of triphenylmethane dye pigments which are formed from nonstaining dyes; hence, these pigments do not chemically stain the skin from either water or organic solvent vehicles. This permits their use in recording inks, typewriter ribbons, and copy papers which may be freely handled without fear of causing unsightly chemical staining of skin and clothing.

Another purpose of this application is to solve the long-debated question of pigment chemists as to the exact chemical structure of triphenylmethane dye lakes with tannic acid, phosphotungstic acid, phenolphthalein, etc. The peculiar resemblance of these water-insoluble lakes to the azo chelates, which has long puzzled pigment chemists, is completely clarified by the compounds of the present invention; and the resultant structures can be easily proven.

The preparation of nonstaining pigments involves the intermediate preparation of nonstaining color bases and dye salts, which are described in detail in the author's copending application, "Nonstaining Color Bases and Their Use," Serial No. 677,837, filed August 13, 1957, now U.S. Patent 2,927,040. This involves the suitable introduction of nitro groups into known triphenylmethane dye structures to lower the logarithmic dissociation constants below 5.0, a value too low for effective chemical combination between these nitrated dyes and skin tissue.

These nonstaining nitrated color bases and color salts (dinitro crystal violet, trinitro crystal violet, dinitro malachite green, etc.) are then combined with suitable lake-forming agents to provide the water-insoluble, nonstaining pigments of the present invention. This may be achieved in several ways: the ingredients may be mixed together in the presence of an organic solvent, or the pigment may be formed by mixing together acidic aqueous solutions of the nonstaining dyes with an aqueous solution of the lake forming material. Both methods will be described in the experimental section.

The author of the present invention noticed early in the course of this work that acetone solutions of dinitro crystal violet carbinol base and phosphotungstic acid were intensely colored before the acetone was removed; but acetone solutions of dinitro crystal violet carbinol base and phenolphthalein (and similar phenols) displayed no dye color until the acetone was removed. This proved that the chemical linkage formed by phenols in this system was easily ruptured by solution in high dipole solvents (acetone, alcohols, etc.). This was in marked contrast to alcohol and acetone solutions of dinitro crystal violet toluenesulfonate salt or the sulfate salt which are intensely colored and strongly indicated a chemical linkage of the "hydrogen bridge" type. The author of the present invention noted that dinitro crystal violet base could be adsorbed onto solid phosphotungstic acid from toluene solution to give an intense adsorption color with relatively low light-stability as compared to the precipitated lake. This adsorption bonding was, therefore, different from the lake-forming bonding; for the lake had high light-stability. It was known to the author that phosphotungstic acid is remarkably soluble in ethanol, a solubility which strongly suggested solvent-solute interreaction to a marked degree. The increased light-stability of the lakes could then be due only to a direct chemical bonding of a non-saltlike nature. This has been found to be the well-known "hydrogen bridge" or "hydrogen bond."

In classical theory, the "hydrogen bridge" was assumed to exist in compounds where hydrogen might have a residual valence of two. The high boiling point of water ($H_2O$) as compared to $H_2S$ or $NH_3$ was ascribed to the presence of extensive hydrogen bonding in water. In recent years the hydrogen bridge was assumed to be a dipole-dipole effect, that is, an electrical interreaction effect. In the author's opinion, the cause of the hydrogen bridge is best understood through the terminology of the Fajans-Weyl screening theory.

According to the Fajans-Weyl screening theory, the proton itself is never completely unscreened; but the strength of the screening varies markedly in different systems. In hydrogen bridge compounds the tendency to form the hydrogen bridge is due to inadequate screening of the proton by poor screening atoms, notably oxygen and nitrogen. It is, therefore, not surprising that phenols tend to form stable solid complexes with triphenylmethane dyes; what is remarkable is the fact that the phosphotungstic acid hydrogen bridge complexes are so stable to acetone and other hydrogen bridge complexes are so stable to acetone and other hydrogen bridge breaking solvents. It is obvious that the protons in phosphotungstic acid are very poorly screened, and a much higher amount of energy is required to break hydrogen bridges formed by phosphotungstic acid than by phenols (with phenols, the strength of the hydrogen bridge is approximately 5–7 kcal./mol; an amount of energy readily supplied by high dipole solvents; but in the case of phosphotungstic acid and phosphomolybdic acid, the strength of the hydrogen bridge must be over 15 kcal./mol and is, therefore, in the energy range of a primary chemical bond).

The light-stability of the phosphotungstic acid complexes with triphenylmethane dyes becomes clear. The lakes are, indeed, related to the azo chelates in that the light-excited color center may transmit the excitation energy directly through a primary chemical bond to a stabilizing metal atom. The sole reason for the lower light-stability of phosphotungstic acid-crystal violet complexes as compared to certain nickel azo dyes is the difference in strength of the bonds formed: 15–20 kcal./mol in the case of PTA-crystal violet and 40–70 kcal./mol in the metal azos.

One may, therefore, differentiate between the saltlike dinitro crystal violet toluenesulfonate (I) and the hydrogen bridge complex of dinitro crystal violet and phenolphthalein (II):

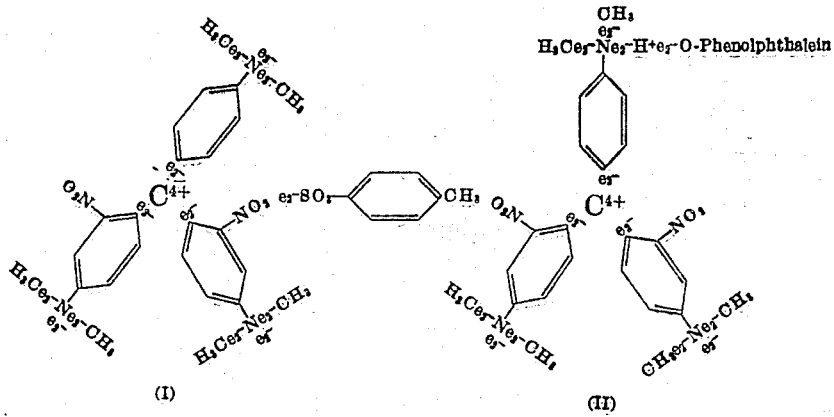

(I)                                   (II)

In the hydrogen bridge lakes, the polarization of the nitrogen atom by the proton is responsible for the stabilization of the unsaturated central core; in the salts the nitrogen atoms are not polarized (i.e., they are not "linked" with any external atom through a polarized electron cloud quanticule). For this reason the light-excited dye salts cannot dissipate the excitation energy imparted by the absorption of radiant energy; and the dye is rapidly oxidized by light. In the lakes, the excitation energy is dissipated by transmission through a definite energy pathway: the hydrogen bridge.

One may, therefore, classify all of the water-insoluble precipitates formed by triphenylmethane dyes and poorly screened proton compounds as hydrogen bridge complexes. This includes all of the phenolic and hydroxylic compounds (tannates, phenolphthalein complexes, etc.), the phosphotungstates, phosphomolybdates, phosphosilicates, and the nitrogen analogues, such as the crystal violet-acridine complexes. The adsorption complexes formed by colloidal silicates, the so-called green earths and white earth lakes, are not true hydrogen bridge complexes, but are midway between a true salt (unpolarized bond) and a hydrogen bridge (polarized bond).

The purpose of this invention is, therefore, to provide a series of nonstaining water-insoluble triphenylmethane dye pigments other than true salts. The colors of certain of these pigments are deeper in tone than the corresponding unsubstituted triphenylmethane dyes and permit the extension of the color spectrum afforded by this dye series. Dinitro crystal violet, for example, gives a black phosphotungstic acid pigment in place of the violet afforded by crystal violet; and dinitro malachite green gives a somewhat deeper green than malachite green itself. The light-stability of the resultant pigments is usually slightly superior to the corresponding pigments from unsubstituted triphenylmethane dyes; and the resultant pigments do not chemically stain the skin from organic vehicles. The advantages of the nonstaining pigments are many: they are inexpensive, possess high intensity, are often of novel shade, possess satisfactory light-stability, and can easily be removed from skin and clothing if allowed to contact the hands and person of the user.

Description

The pigments of the present invention may be directly prepared from either the color base or the color salt. In the laboratory small amounts of the nonstaining pigments are conveniently made from the nonstaining color base using acetone as a solvent, but in the commercial preparation water solutions of the pigment formers are preferred for economic reasons. In this case it is necessary to dissolve the color base in dilute mineral acid (preferably hydrochloric acid); and the lake-former is added to this acidic solution as the water-soluble salt (sodium tannate, sodium tungstate-sodium phosphate, etc.).

An example of a nonstaining pigment prepared from organic solution is the dinitro crystal violet-phosphotungstic acid complex. To prepare the pigment in this manner, 5.0 grams of dinitro crystal violet carbinol base (2,2′ - dinitro - 4,4′,4″ - tris(dimethylamino) - triphenylcarbinol) and 11.5 grams commercial phosphotungstic acid were dissolved in 150 grams acetone to form a black solution; evaporation of the acetone at room temperature under reduced pressure gave a fine black powder of dinitro crystal violet phosphotungstate pigment. The ratio of phosphotungstic acid to dye base may be varied considerably in this preparation with very little change in color properties of the resultant pigment.

An example of a nonstaining pigment prepared from aqueous solution is the dinitro crystal violet-tannic acid complex. To prepare this pigment, 5.0 grams of dinitro crystal violet carbinol base is dissolved in dilute aqueous hydrochloric acid to form a dark-colored solution. To this acidic solution is slowly added with vigorous stirring a dilute aqueous solution of 3.5 grams of commercial tannic acid dissolved in sufficient alkali necessary to effect solution. Contact of the alkaline tannate solution with the acidic dye solution immediately causes precipitation of the blue-black (deep violet) dinitro crystal violet tannate complex. This is filtered off from the still weakly acidic solution (pH 4–5), washed with water, and dried to give an intense blue-black (deep violet) powder.

Another example of this invention is the non-staining pigment of trinitro crystal violet with phosphomolybdic acid. To prepare this pigment, 5.0 grams of trinitro crystal violet carbinol base (2,2′,2″-trinitro-4,4′,4″-tris(dimethylamino)-triphenylcarbinol) is dissolved in 125 ml. of acetone and 12.0 grams of commercial phosphomolybdic acid is added to the dye solution. After 10 minutes the acetone is removed under reduced pressure to yield the deep blue-black pigment as a fine powder. The ratio of dye to phosphomolybdic acid in this complex may be varied considerably with little change in color properties of the resultant pigment. The reason for this is that one molecule of phosphomolybdic acid may contain one, two, three, or possibly more molecules of dye; so that the crystalline complexes containing millions of complex acid molecules are rarely true stoichiometric compounds, that is, they may depart considerably from an "ideal" chemical structure.

Another example of this invention is the nonstaining pigment from dinitro crystal violet and phenolphthalein. To prepare this pigment, 5.0 grams of dinitro crystal violet carbinol base and 3.3 grams of phenolphthalein are dissolved in 150 ml. of acetone to give a deep yellow solution; evaporation of the acetone under reduced pressure gives a deep violet (almost blue-black) hydrogen bridge complex dinitro crystal violet phenolphthalein complex. This is insoluble in water but soluble with destruction of the hydrogen bridge bond in acetone and alcohols. The light-stability of this particular complex is rather poor.

An example of a nonstaining adsorption complex with a colloidal silicate is the lake prepared from dinitro crystal violet and Attapulgus brand fuller's earth. To a solution of 3.5 grams of dinitro crystal violet carbinol base in 200 ml. of toluene is added 100 grams of acid clay. Sufficient toluene is then added to give a fluid suspension, and the clay-toluene solution suspension is agitated for forty minutes. The dye base is adsorbed into the clay to give an intense blue-black lake, which is then filtered off and dried. The resultant pigment contains about 3.2% dye and is intended for use where a very cheap pigment is desired.

It should be clearly understood that the invention is not limited to the examples set forth but is generally applicable to the preparation of any water-insoluble pigment from a nonstaining color base or dye salt of the triphenylmethane dye series. In the commercial preparation of these pigments any number of variations may be introduced to improve the crystalline structure, achieve greater light-stability in the resultant pigment, improve the pigment yield, etc.

It is to be understood that the nonstaining pigments of this invention may be used to make recordings on appropriate surfaces by any desired or conventional method or technique. For instance, the pigment dispersed in a suitable printing vehicle may be used for direct printing on paper or the pigment may be utilized as a component of the coating of a transfer sheet.

An example of a recording ink made with these materials is a coating dope using 3 grams of dinitro crystal violet phosphotungstate complex, 3 grams oleic acid, and one gram of carnauba wax. The ingredients are mixed at 85° C., and a cotton ribbon is inked with the resultant dope. Prints made with this ribbon on a standard typewriter have a good intense black color.

Another example of a recording ink made with these nonstaining pigments is a printing ink using 5 grams of trinitro crystal violet phosphomolybdate complex, 5 grams oleic acid, and 1 gram ouricury wax. The ingredients were thoroughly mixed at 85° C., and the resultant ink was used to ink a cotton ribbon.

It should be understood that recording inks made with these nonstaining pigments may be used as a paste in ball point pen inks, in stencils, in mimeograph machines, and for many recording purposes.

An example of a carbon-type copy paper made with these nonstaining pigments is a coating dope for a one-time carbon application using dinitro crystal violet silicate adsorption complex. To 50 grams of an acid colloidal silicate lake containing 3.2% dinitro crystal violet is added 50 grams of paraffin oil and 15 grams of carnauba wax. The ingredients are thoroughly mixed and coated at 85° C. on a suitable base paper. This one time copy paper when used in a manifolding system gives a good intense blue-black print.

Another example of a copy paper made with these nonstaining pigments is a coating dope for a one-time carbon application using trinitro crystal violet phosphomolybdate complex. To 5 grams of trinitro crystal phosphomolybdate is added 5 grams of oleic acid, 15 grams paraffin oil, 6 grams carnauba wax, and 6 grams high melting paraffin wax. The ingredients are thoroughly mixed and coated at 85° C. on a suitable base paper. This one-time copy paper when used in a manifolding system gives an intense blue-black to black print of satisfactory light-stability.

In other words, the recording media of this invention may be used in a great variety of recording, printing, and manifolding systems and is not limited to the examples set forth.

Having described my invention, I claim:

1. A printing medium comprising the intensely colored colloidal silicate lake of a nonstaining triarylmethane dye base represented by the following formula:

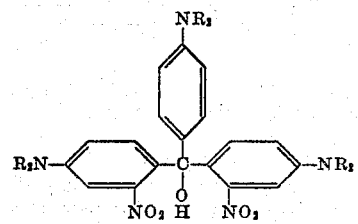

wherein R is a lower alkyl group, said lake dispersed in a suitable organic vehicle to form an intensely colored recording ink.

2. A printing medium comprising the intensely colored colloidal silicate lake of a nonstaining triarylmethane dye base represented by the following formula:

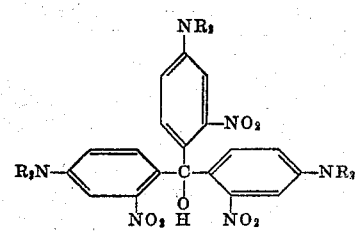

wherein R is a lower alkyl group, said lake dispersed in a suitable organic vehicle to form an intensely colored recording ink.

3. A printing medium comprising the intensely colored hydrogen bridge complex of phosphotungstic acid with a nonstaining triarylmethane color base represented by the following formula:

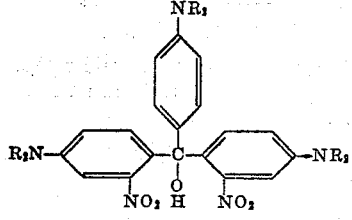

wherein R is a lower alkyl group, said complex dispersed in a suitable organic vehicle to form an intensely colored recording ink.

4. A printing medium comprising the intensely colored hydrogen bridge complex of phosphotungstic acid with a nonstaining triarylmethane color base represented by the following formula:

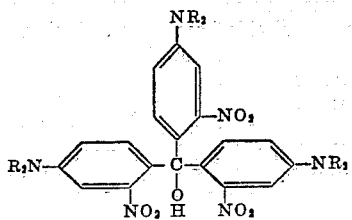

wherein R is a lower alkyl group, said complex dispersed in a suitable organic vehicle to form an intensely colored recording ink.

5. A printing medium comprising the intensely colored hydrogen bridge complex of phosphomolybdic acid with a nonstaining triarylmethane color base represented by the following formula:

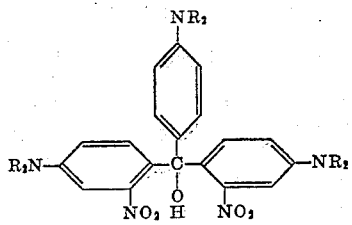

wherein R is a lower alkyl group, said complex dispersed in a suitable organic vehicle to form an intensely colored recording ink.

6. A printing medium comprising the intensely colored hydrogen bridge complex of phosphomolybdic acid with a nonstaining triarylmethane color base represented by the following formula:

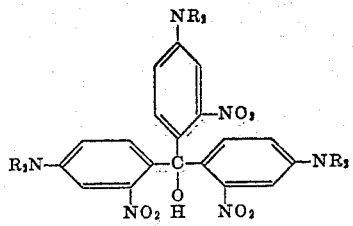

wherein R is a lower alkyl group, said complex dispersed in a suitable organic vehicle to form an intensely colored recording ink.

7. A printing medium comprising the intensely colored hydrogen bridge complex of tannin with a nonstaining triarylmethane color base represented by the following formula:

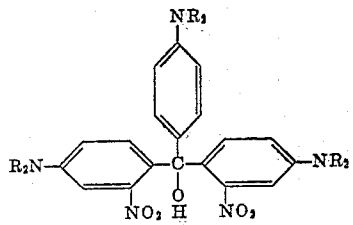

wherein R is a lower alkyl group, said complex dispersed in a suitable organic vehicle to form an intensely colored recording ink.

8. A printing medium comprising the intensely colored hydrogen bridge complex of tannin with a nonstaining triarylmethane color base represented by the following formula:

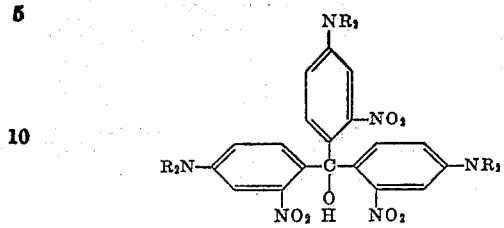

wherein R is a lower alkyl group, said complex dispersed in a suitable organic vehicle to form an intensely colored recording ink.

9. A new composition of matter comprising the intensely colored adsorption complexes of colloidal silicates with N,N',N''-alkylated-2,2'-dinitro-4,4',4'' - triaminotriphenylcarbinols.

10. A new composition of matter comprising the intensely colored adsorption complexes of colloidal silicates with N,N',N''-alkylated-2,2',2''-trinitro-4,4',4''-triaminotriphenylcarbinols.

11. A new composition of matter comprising the intensely colored water-insoluble complexes of phosphotungstic acid with N,N',N''-alkylated-2,2'-dinitro-4,4',4''-triaminotriphenylcarbinols.

12. A new composition of matter comprising the intensely colored water-insoluble complexes of phosphotungstic acid with N,N',N''-alkylated-2,2',2''-trinitro-4,4',4''-triaminotriphenylcarbinols.

13. A new composition of matter comprising the intensely colored water-insoluble complexes of phosphomolybdic acid with N,N',N''-alkylated-2,2'-dinitro-4,4',4''-triaminotriphenylcarbinols.

14. A new composition of matter comprising the intensely colored water-insoluble complexes of phosphomolybdic acid with N,N',N''-alkylated-2,2',2''-trinitro-4,4',4''-triaminotriphenylcarbinols.

15. A new composition of matter comprising the intensely colored water-insoluble complexes of tannin with N,N',N''-alkylated-2,2'-dinitro-4,4',4'' - triaminotriphenylcarbinols.

16. A new composition of matter comprising the intensely colored water-insoluble complexes of tannin with N,N'-alkylated-2,2'-dinitro-4,4'-diaminotriphenylcarbinols.

17. A new composition of matter comprising the intensely colored water-insoluble complexes of phenolphthalein with N,N',N''-alkylated-2,2'-dinitro-4,4',4''-triaminotriphenylcarbinols.

References Cited in the file of this patent

UNITED STATES PATENTS

| | | |
|---|---|---|
| 2,191,674 | Muller et al. | Feb. 27, 1940 |
| 2,413,972 | Herlocker et al. | Jan. 7, 1947 |
| 2,755,201 | Webber et al. | July 17, 1956 |
| 2,755,203 | Stallman | July 17, 1956 |
| 2,755,420 | Locke | July 17, 1956 |

FOREIGN PATENTS

| | | |
|---|---|---|
| 938 | Great Britain | Mar. 4, 1881 |
| 1,970 | Great Britain | May 6, 1881 |
| 40,260 | Norway | Aug. 4, 1923 |